United States Patent
Oh et al.

(10) Patent No.: US 9,996,601 B2
(45) Date of Patent: Jun. 12, 2018

(54) DATA SYNCHRONIZATION

(71) Applicant: Empire Technology Development LLC, Wilmington, DE (US)

(72) Inventors: Hyun-Oh Oh, Gwacheon-si (KR); Ju-Hyung Son, Uiwang-si (KR); Jin-Sam Kwak, Uiwang-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 370 days.

(21) Appl. No.: 14/385,015

(22) PCT Filed: Nov. 14, 2013

(86) PCT No.: PCT/US2013/070111
§ 371 (c)(1),
(2) Date: Sep. 12, 2014

(87) PCT Pub. No.: WO2015/073006
PCT Pub. Date: May 21, 2015

(65) Prior Publication Data
US 2016/0239556 A1 Aug. 18, 2016

(51) Int. Cl.
*G06F 17/30* (2006.01)
*H04L 29/08* (2006.01)
(Continued)

(52) U.S. Cl.
CPC .... *G06F 17/30581* (2013.01); *G06F 11/1448* (2013.01); *G06F 17/30365* (2013.01);
(Continued)

(58) Field of Classification Search
CPC ........... G06F 17/30581; G06F 17/1448; G06F 17/30365; G06F 21/6209; H04L 63/00
(Continued)

(56) References Cited

U.S. PATENT DOCUMENTS 6,944,857 B1 * 9/2005 Glaser ..................... G06F 8/65
713/155
7,007,041 B2 2/2006 Multer et al.
(Continued)

FOREIGN PATENT DOCUMENTS

WO 0125938 A1 4/2001

OTHER PUBLICATIONS

"How to Configure Offline Files to Synchronize When a Particular Network Connection Becomes Active," accessed at: http://web.archive.org/web/20131007081553/http://support.microsoft.com/kb/312171, accessed on Aug. 13, 2014, pp. 1-2.
(Continued)

*Primary Examiner* — Abu Sholeman (57) ABSTRACT

Technologies are generally described for a data synchronization scheme. In some examples, a method performed under control of a client device may include connecting to a server based at least in part on user account login information; receiving, from the server, a data file stored in connection with the user account; storing the received data file in a local data storage; receiving a request to logout the client device; determining that the client device is disconnected from the server and/or that the data file stored on the local data storage is not synchronized with the data file stored in connection with the user account; and encrypting the data file stored on the local data storage.

9 Claims, 8 Drawing Sheets (51) Int. Cl.
H04L 29/06 (2006.01)
G06F 11/14 (2006.01)
G06F 21/62 (2013.01)

(52) U.S. Cl.
CPC .......... *G06F 21/6209* (2013.01); *H04L 63/00* (2013.01); *H04L 67/06* (2013.01); *H04L 67/1095* (2013.01); *H04L 67/42* (2013.01); *G06F 2201/86* (2013.01)

(58) Field of Classification Search
USPC ........................................................ 713/164
See application file for complete search history.

(56) References Cited

U.S. PATENT DOCUMENTS

| | | | |
|---|---|---|---|
| 7,448,996 B2 | 11/2008 | Khanuja et al. | |
| 8,407,768 B1* | 3/2013 | Hayter | H04L 63/0853 726/5 |
| 8,520,557 B2* | 8/2013 | Rajan | H04W 76/045 370/277 |
| 8,639,781 B1* | 1/2014 | Motes | H04L 67/06 455/414.1 |
| 9,198,043 B2* | 11/2015 | Kita | G06F 21/31 |
| 2003/0131245 A1* | 7/2003 | Linderman | H04L 63/0218 713/176 |
| 2004/0146015 A1* | 7/2004 | Cross | G06Q 20/3829 370/328 |
| 2007/0106668 A1* | 5/2007 | Maegawa | G06F 21/34 |
| 2007/0266440 A1* | 11/2007 | Kim | G06F 21/10 726/26 |
| 2008/0082903 A1 | 4/2008 | McCurdy et al. | |
| 2009/0080663 A1* | 3/2009 | Cherian | G06F 3/0605 380/286 |
| 2009/0183254 A1* | 7/2009 | Franco | G06F 21/34 726/17 |
| 2009/0207013 A1* | 8/2009 | Ayed | G08B 13/1427 340/539.1 |
| 2009/0323563 A1* | 12/2009 | Ho | H04B 7/061 370/280 |
| 2010/0031335 A1* | 2/2010 | Handler | H04L 9/3226 726/8 |
| 2010/0166058 A1* | 7/2010 | Perlman | A63F 13/12 375/240.02 |
| 2011/0293095 A1* | 12/2011 | Ben Ayed | H04L 63/0492 380/270 |
| 2012/0019379 A1* | 1/2012 | Ben Ayed | G08B 13/1436 340/539.1 |
| 2012/0089710 A1* | 4/2012 | Rakowski | H04L 41/0803 709/220 |
| 2012/0137130 A1 | 5/2012 | Vainstein et al. | |
| 2012/0264457 A1* | 10/2012 | Khosravy | G06Q 30/0241 455/456.3 |
| 2013/0061307 A1* | 3/2013 | Livne | H04W 12/06 726/7 |
| 2013/0067243 A1* | 3/2013 | Tamayo-Rios | G06F 21/44 713/193 |
| 2013/0218829 A1 | 8/2013 | Martinez | |
| 2013/0247222 A1 | 9/2013 | Maksim et al. | |
| 2014/0026182 A1* | 1/2014 | Pearl | G06F 21/60 726/1 |
| 2014/0115329 A1* | 4/2014 | Sturonas | H04L 63/1466 713/165 |
| 2014/0157435 A1* | 6/2014 | Stamos | H04L 63/04 726/28 |
| 2014/0189483 A1* | 7/2014 | Awan | H04L 63/08 715/212 |
| 2014/0245015 A1* | 8/2014 | Velamoor | H04L 63/061 713/171 |
| 2014/0304836 A1* | 10/2014 | Velamoor | G06F 21/6209 726/28 |
| 2015/0039557 A1* | 2/2015 | Howard | G06F 17/30174 707/617 |
| 2015/0052353 A1* | 2/2015 | Kang | G06F 21/6218 713/165 |
| 2015/0127942 A1* | 5/2015 | Lee | G06F 21/602 713/168 |
| 2015/0135300 A1* | 5/2015 | Ford | H04L 67/1097 726/11 |
| 2015/0163206 A1* | 6/2015 | McCarthy | G06F 21/6227 713/171 |
| 2015/0200972 A1* | 7/2015 | Suryavanshi | H04L 63/0428 726/1 |
| 2015/0215130 A1* | 7/2015 | Brophy | H04L 9/3268 713/158 |
| 2015/0304306 A1* | 10/2015 | Ponsford | G06F 21/6218 713/171 |
| 2016/0239556 A1* | 8/2016 | Oh | H04L 67/1095 |

OTHER PUBLICATIONS

"Synchronizing offline items when you log on to or log off from a computer," Accessed at http://web.archive.org/web/20120106123711/http://technet.microsoft.com/en-us/library/cc781203(v=ws.10).aspx, Accessed on Aug. 26, 2014, pp. 2.
"Working with Offline Files and Folders," accessed at http://web.archive.org/web/20130413030027/https://espace.cern.ch/winservices-help/DFS/WorkingWithNetworkFiles/Pages/WorkingWithOfflineFiles.aspx, accessed on Aug. 26, 2014, pp. 5.
Fitzpatrick, J., "Setup SSH on Your Router for Secure Web Access from Anywhere," Accessed at http://web.archive.org/web/20130926021213/http://www.howtogeek.com/68061/setup-ssh-on-your-router-for-secure-web-access-from-anywhere/, published Jul. 13, 2011, pp. 6.
Hoffman, C., "5 Cool Things You Can Do With an SSH Server," Accessed at http://www.howtogeek.com/114812/5-cool-things-you-can-do-with-an-ssh-server/, Accessed on Aug. 26, 2014, pp. 5.
International Search Report and Written Opinion for International Patent Application No. PCT/US2013/070111 dated May 19, 2014.

* cited by examiner

DATA SYNCHRONIZATION

CROSS-REFERENCE TO RELATED APPLICATION

This Application is the U.S. National Stage filing under 35 U.S.C. § 371 of International Application No. PCT/US13/70111, filed on Nov. 14, 2013.

BACKGROUND

The term "cloud computing" refers to computing models for enabling ubiquitous, convenient, or on-demand network access to a shared pool of configurable computing resources (e.g., networks, servers, storage, applications, or services). Cloud-based services are rapidly becoming a primary means by which services are provided to businesses and consumers over the Internet or even proprietary networks.

SUMMARY

In an example, a method performed under control of a client device may include connecting to a server based at least in part on user account login information; receiving, from the server, a data file stored in connection with the user account; storing the received data file in a local data storage; receiving a request to logout the client device; determining that the client device is disconnected from the server and/or that the data file stored on the local data storage is not synchronized with the data file stored in connection with the user account; and encrypting the data file stored on the local data storage.

In another example, a method performed under control of a server may include receiving, from a client device, a request to connect to a user account; establishing a connection with the client device; transmitting, to the client device, a data file stored in connection with the user account; reestablishing the connection with the client device which had been disconnected; receiving, from the client device, an encrypted data file and a request to update the data file stored in connection with the user account; decrypting the encrypted data file; and updating the data file stored in connection with the user account by replacing the data file stored in connection with the user account with the decrypted data file.

In yet another example, a client device may include a request receiver unit configured to receive at least one of a request to connect to a server or a request to logout the client device; a connection handler unit configured to connect to the server based at least in part on user account login information; a file receiver unit configured to receive, from the server, a data file stored in connection with the user account; a data file management unit configured to store the received data file in a local data storage; and an encryption unit configured to encrypt the data file stored on the local data storage when the request receiver unit receives the request to logout the client device and/or the client device is disconnected from the server.

In yet another example, a computer-readable storage medium may store thereon computer-executable instructions that, in response to execution, cause a client device to perform operations, including connecting to a server based at least in part on user account login information; receiving, from the server, a data file stored in connection with the user account; storing the data file in a local data storage; modifying the data file stored on the local data storage in accordance with an input to the client device; receiving a request to logout the client device; encrypting the modified data file, when the client device is disconnected from the server and/or when the modified data file is not synchronized with the data file stored in connection with the user account.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to data synchronization. Further, technologies are herein generally described for synchronizing data between a server and a client device.

In some examples, a user of a remote storage service (such as a cloud storage service), who has stored a data file in a remote storage server, may connect to the remote storage server using a client device to have the data file downloaded to the client device. The user may then view and/or modify the downloaded data file using the client device. If the downloaded data file is modified on or by the client device, the modified data file may be synchronized with the data file stored on the remote storage server, during the modification and/or upon completion thereof. In order to synchronize the data file, the client device may transmit the modified data file to the remote storage server, and the remote storage server may replace the data file with the modified data file. But, in the event the user logs off or disconnects the client device before being able to completely synchronize the modified data file due for one or more various reasons, for example, the client device may be disconnected from the remote storage, or the synchronization takes long hours but the user wants to leave the client device right away, the client device may encrypt the modified data file on the client device to prevent unauthorized access to the data file.

In some examples, when the user logs on the client device again and/or reconnects to the remote storage server, the client device may send, to the remote storage server, a request to update the data file stored on the remote storage server using the encrypted version of the data file. Then, the remote storage server may decrypt the encrypted data file and replace the data file stored thereon with the decrypted version of data file in order, thus synchronizing the data file between the client device and the remote storage server. After the synchronization, the client device may delete the encrypted data file stored on the client device.

In some examples, the remote storage server may generate an encryption key and provide it to the client device to encrypt the data file on the client device. In such cases, the client device may remove the encryption key after encrypting the data file so that unauthorized users (and, perhaps, even the user) cannot decrypt the encrypted data file. The remote storage server may maintain the encryption key to decrypt the encrypted data file, which may be received from the client device at a later time. Alternatively or additionally, the client device may generate the encryption key and provide it to the remote storage server to decrypt the encrypted data file. In such cases, the client device may generate the encryption key based at least in part on the user's login information for access to the remote storage server. The client device may remove the encryption key after encrypting the data file, however when the user logs on the client device again and inputs the login information to gain access to the remote storage server, the client device may regenerate the encryption key for the user, via the client device, to access the encrypted data file.

Figure 1:
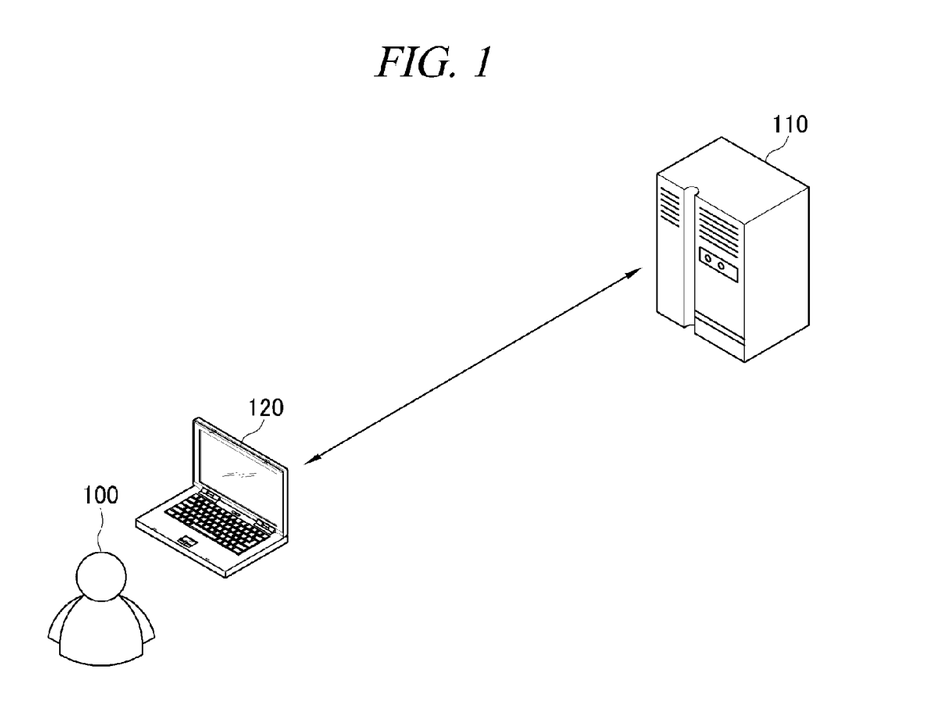
FIG. 1 schematically shows an illustrative example of an environment in which a client device, on behalf of a user, connects to a server, arranged in accordance with at least some embodiments described herein.

FIG. 1 schematically shows an illustrative example of an environment in which a client device 120, on behalf of a user 100, connects to a server 110, arranged in accordance with at least some embodiments described herein As depicted, client device 120, which may be owned and/or controlled by user 100, may be configured to be communicatively coupled to server 110 over a network such as, for example, the Internet, a wireless network, a cellular network, a wide area network (WAN), a metropolitan area network (MAN), a local area network (LAN), a campus area network (CAN), a virtual private network (VPN), etc. Client device 120 may be of any type of electronic device configured to store, retrieve, compute, transmit and/or receive data; and may include, for example, a personal computer such as a laptop computer or a desktop computer, a tablet, a smartphone, a personal digital assistant (PDA), a mobile phone, a hybrid of the aforementioned devices (e.g., a "phablet"), a television, a gaming console, etc.

Server 110 may be configured to provide a remote storage service to user 100. By way of example, but not limitation, server 110 may be representative of a multitude of such embodiments that make up a cloud platform, and may include a storage (not shown) to provide multiple client platforms. Non-limiting examples of such cloud storage services may include Dropbox®, Google Drive®, Microsoft SkyDrive®, Amazon Cloud Drive®, etc. Server 110 may provide a storage area (which is a part of the storage of server 110) dedicated to a user account of user 100. User 100 may access the user account based on user account login information (e.g., a user ID and a passcode to the user account) and store a data file in the storage area of server 110 that is dedicated to the user account using a corresponding client platform. Then, user 100 may access, download and/or modify the data file stored on the storage area of server 110 that is dedicated to the user account using a corresponding client platform based on the user account login information.

In some embodiments, user 100 may log on client device 120 to access and download the data file (which may be stored in connection with the user account on server 110) to a local data storage (not shown) of client device 120. Then, user 100 may work on the data file stored on the local data storage, for example, by viewing and/or modifying the data file displayed on a display (not shown) of client device 120. Intentionally or not, client device 120 may disconnect from server 110 while user 100 is in the process of modifying the data file that is stored on the local data storage.

In some embodiments, when user 100 inputs a request to logout client device 120 after having accessed the data file, client device 120 may be configured to determine whether client device 120 is disconnected from server 110. During the time between the download of the data file and the user request to logout client device 120, the data file stored on the local data storage may or may not be modified by client device 120. However, when client device 120 is disconnected, server 110 has no indication of any modifications made to the data file stored on the local data storage of client device 120.

Thus, for when client device 120 determines that client device 120 is disconnected from server 110, client device 120 may be configured to encrypt the data file stored on the local data storage of client device 120 to be synchronized with the data file stored in connection with the user account at a later time. Alternatively and/or additionally, for when user 100 inputs the request to logout client device 120 after having accessed the data file, client device 120 may be configured to determine whether the data file stored on the local data storage is synchronized with the data file stored in connection with the user account. For when client device 120 determines that the data file stored on the local data storage is not synchronized with the data file stored in connection with the user account, client device 120 may also be configured to encrypt the data file stored on the local data storage for synchronization with the data file stored in connection with the user account at a later time. An encryption key for encrypting the data file (and for decrypting the encrypted data file by server 110) may be provided by server 110 or generated by client device 120, and that will be described more in detail with reference FIG. 2 below.

As such, since the data file (which may or may not be modified) is stored on client device 120 in encrypted form, other users, who may log on client device 120 after user 110 logged out client device 120, cannot access the data file.

In some embodiments, when user 100 logs on client device 120 again to reconnect to server 110 based on the user account login information, client device 120 may be configured to perform a delayed synchronization of the data file. That is, client device 120 may transmit, to server 110, the encrypted data file together with a request to synchronize the data file. Then, server 110 may decrypt the encrypted data file using the encryption key, and update the data file stored in connection with the user account by replacing it with the decrypted data file. In some embodiments, client device 120 may delete the encrypted data file after transmitting it to server 110. As such, after the delayed synchronization, server 110 may be able to update the data file with a version thereof that may have been modified by client device 120.

Figure 2:
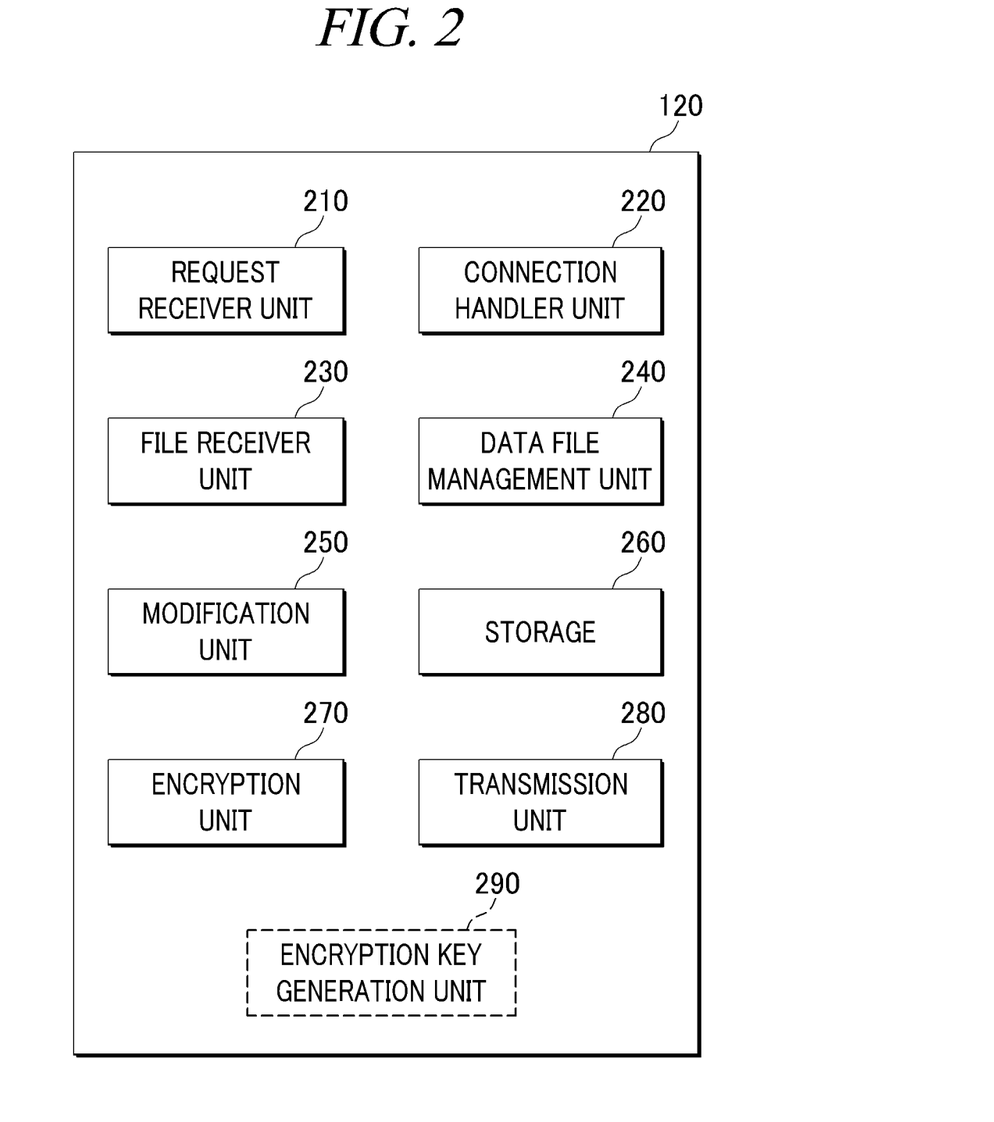
FIG. 2 shows a schematic block diagram illustrating an example architecture of a client device that implements at least portions of a data synchronization scheme, arranged in accordance with at least some embodiments described herein.

FIG. 2 shows a schematic block diagram illustrating an example architecture of client device 120 that implements at least portions of a data synchronization scheme, arranged in accordance with at least some embodiments described herein. Reference may be made to the embodiments depicted and described with reference to FIG. 1.

As depicted, client device 120 may include a request receiver unit 210, a connection handler unit 220, a file receiver unit 230, a data file management unit 240, a modification unit 250, a storage 260, an encryption unit 270, and a transmission unit 280. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Request receiver unit 210 may be configured to receive, from client device 120 via a user account corresponding to user 100, a request to connect to server 110, and/or, at a later time, a request to logout client device 120. Request receiver unit 210 may further configured to receive, from client device 120 on behalf of user 100, user account login information to access to a user account corresponding to server 110. User 100 may input the above requests using any types of user interface devices that may be operatively embedded in and/or communicatively connected to client device 120, such as, for example, a keyboard, a mouse, a microphone, a touch screen, a wireless headset, etc.

Connection handler unit 220 may be configured to connect to server 110 based at least in part on the user account login information. By way of example, but not limitation, connection handler unit 220 may be operatively connected to a network adapter that is a hardware component of client device 120 to enable a connection between server 110 and client device 120, via a network. Connection handler unit 220 may be further configured to reconnect to server 110 based on the user account login information after client device 120 has been disconnected from server 110.

File receiver unit 230 may be configured to receive, from server 110, a data file stored in connection with the user account. In some embodiments, file receiver unit 230 may be further configured to receive an encryption key from server 110. In such cases, server 110 may generate the encryption key and maintain it for decrypting an encrypted data file which is encrypted by client device 120 based on the encryption key.

Data file management unit 240 may be configured to manage the data file and/or the encryption key stored on storage 260. As will be described below, when the data file is encrypted by encryption unit 270, data file management unit 240 may delete the encryption key stored on storage 260 so that other users are unable to access the encrypted data file after client device 120 is logged off or otherwise disconnected from server 110.

Modification unit 250 may be configured to modify the data file stored on storage 260 in accordance with a user input to client device 120. In some embodiments, modification unit 250 may be communicatively connected to a user input device (e.g., a keyboard) to receive the user input and, based on the user input, to modify the data file stored on storage 260.

Storage 260 may be configured to store the data file received from server 110. The stored data file may then be modified by modification unit 250 and/or encrypted by encryption unit 270 (as will be described below). Further, the stored data file may be transmitted to server 110 for data synchronization. In some embodiments, storage 260 may be further configured to store an encryption key for encrypting the stored data file, which may be generated by and received from server 110 as described above; or that may be generated on client device 120 (e.g., by an encryption key generation unit 290, which will be described below). Further, after the data file stored on storage 260 is synchronized with the data file stored in connection with the user account, data file management unit 240 may delete the data file stored on storage 260.

Encryption unit 270 may be configured to encrypt the data file stored on storage 260 when request receiver unit 210 receives the request to logout client device 120 and client device 120 is disconnected from server 110. In some embodiments, when modification unit 250 accesses and/or modifies the data file stored on storage 260 and the modified data file is not synchronized with the data file stored in connection with the user account, encryption unit 270 may encrypt the accessed and/or modified data file.

Transmission unit 280 may be configured to transmit, to server 110, the encrypted data file stored on storage 260. In some embodiments, transmission unit 280 may transmit the encrypted data file to server 110 when client device 120 is reconnected to server 110. Further, when client device 120 is reconnected to server 110, transmission unit 280 may further transmit, to server 110, a request for server 110 to synchronize the data file stored in connection with the user account with the encrypted data.

In some embodiments, client device 120 may optionally further include encryption key generation unit 290. Encryption key generation unit 290 may be configured to generate an encryption key based on at least one of the user account login information or device information of client device 120 (e.g., a unique device ID). In some embodiments, encryption unit 270 may encrypt the data file stored on storage 260 based on the encryption key. The encryption key may be provided to server 110 (e.g., by transmission unit 280), and server 110 may decrypt the encrypted data file with the encryption key.

Figure 3:
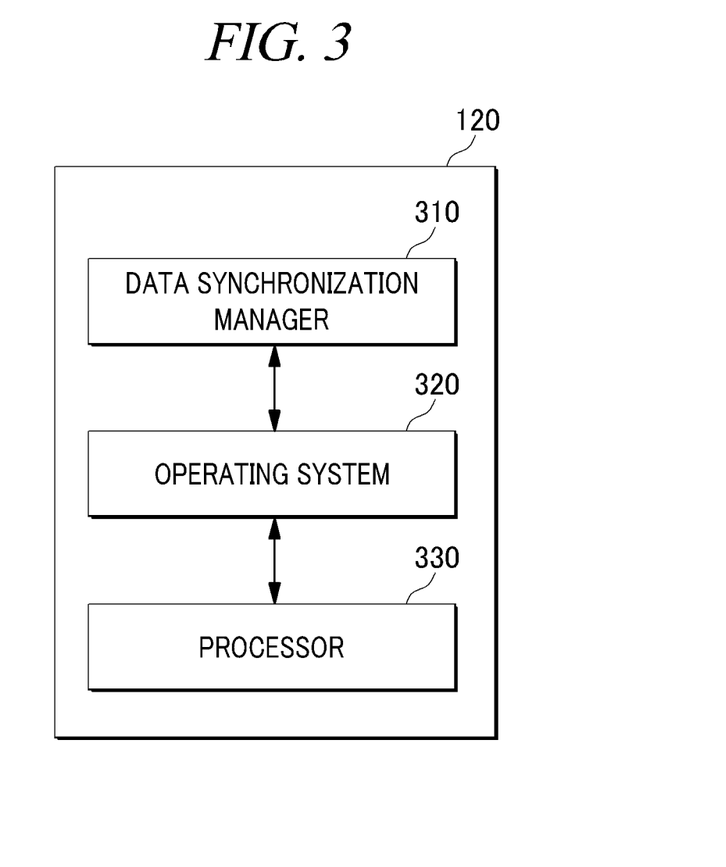
FIG. 3 shows a schematic block diagram illustrating another example architecture of a client device that implements at least portions of a data synchronization scheme, arranged in accordance with at least some embodiments described herein.

FIG. 3 shows a schematic block diagram illustrating another example architecture of a client device that implements at least portions of a data synchronization scheme, arranged in accordance with at least some embodiments described herein. Reference may be made to the embodiments depicted and described with reference to FIGS. 1 and 2.

As depicted, client device 120 may include a data synchronization manager 310, an operating system 320 and a processor 430. In some embodiments, data synchronization manager 310 may be at least a part of an application associated with a remote storage service (such as a cloud storage service) provided by server 110. In such cases, server 110 may generate the application and provide it to client device 120, when client device 120 connects to server 110, to enable a data file stored in connection with a user account for user 100 to be downloaded. By way of example, but not limitation, the application associated with the remote storage service may be a program module that provides client device 120 with an interface for downloading the data file stored in connection with the user account.

Data synchronization manager 310 may be configured to operate on operating system 320 such that the data synchronization scheme, as described herein, may be implemented. Operating system 320 may allow data synchronization manager 310 to manipulate processor 330 to implement the data synchronization scheme as described herein.

Figure 4:
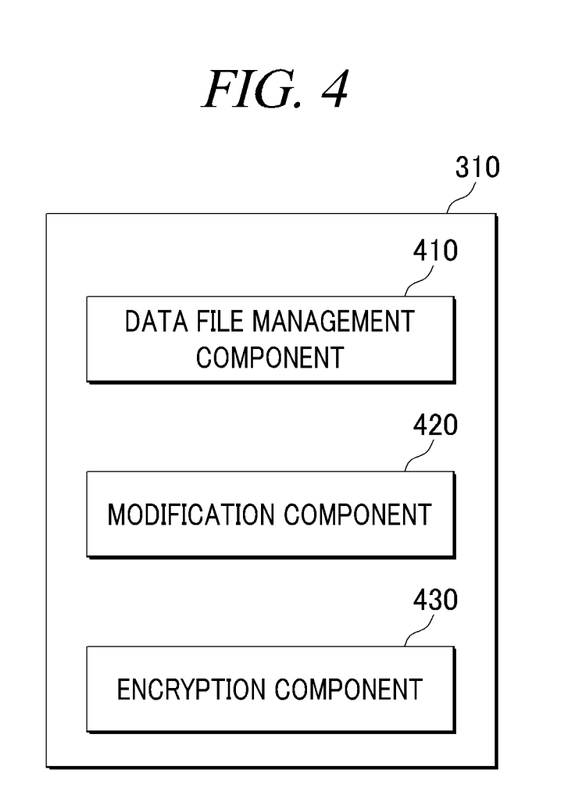
FIG. 4 shows a schematic block diagram illustrating an example architecture of a data synchronization manager that implements at least portions of a data synchronization scheme, arranged in accordance with at least some embodiments described herein.

FIG. 4 shows a schematic block diagram illustrating an example architecture of data synchronization manager 310 that implements at least portions of a data synchronization scheme, arranged in accordance with at least some embodiments described herein. Reference may be made to the embodiments depicted and described with reference to FIGS. 1-3.

As depicted, data synchronization manager 310 may include a data file management component 410, a modification component 420, and an encryption component 430.

Data file management component 410 may be configure to store, on a local data storage (e.g., storage 260 in FIG. 2), a data file received from server 110 and/or an encryption key that may be generated by server 110 or client device 120 (e.g., encryption key generation unit 290 in FIG. 2). Further, data file management component 410 may be adapted to delete the data file stored on the local data storage after synchronization of the data file between server 110 and client device 120 is completed, and to delete the encryption key after the data file stored on the local data storage is encrypted by encryption component 430.

Modification component 420 may be configured to modify the data file stored on the local data storage in accordance with an input to client device 120, and encryption component 430 may be adapted to encrypt the data file stored on the local data storage when user 100 attempts to logout client device 120 or otherwise disconnect client device 120 from server 110.

Figure 5:
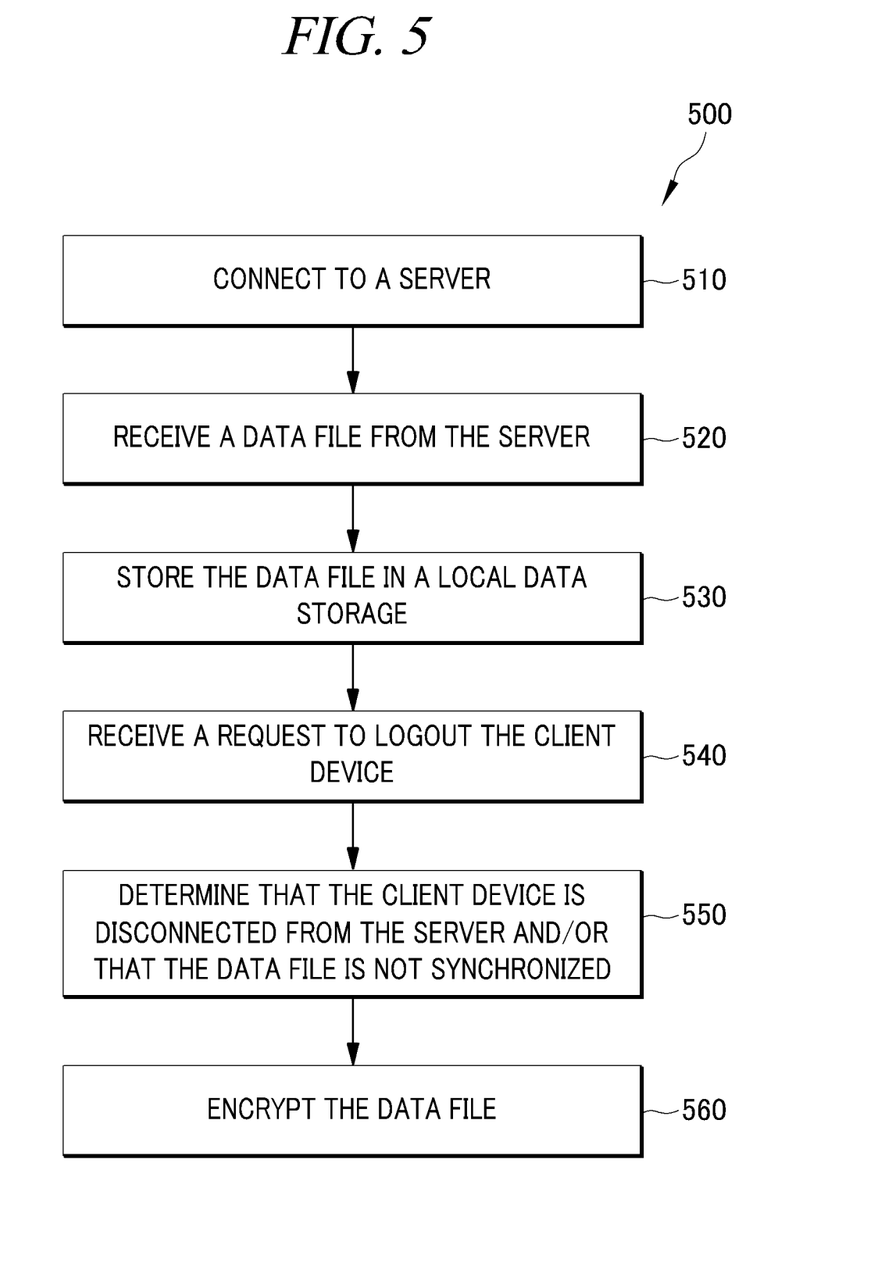
FIG. 5 shows an example processing flow for execution of at least portions of a data synchronization scheme, arranged in accordance with at least some embodiments described herein.

FIG. 5 shows an example processing flow for execution of at least portions of a data synchronization scheme, arranged in accordance with at least some embodiments described herein.

Process 500 may be implemented in a client platform such as client device 120 including request receiver unit 210, connection handler unit 220, file receiver unit 230, data file management unit 240, modification unit 250, storage 260, encryption unit 270, and transmission unit 280. Process 500 may also be implemented by computer programs or program modules that may be adapted to provide a data synchronization scheme and hosted by client device 120, such as data synchronization manager 310 including data file management component 410, modification component 420, and encryption component 430. Thus, reference may be made to the embodiments depicted and described with reference to FIGS. 1-4. Process 500 may include one or more operations, actions, or functions as illustrated by one or more blocks 510, 520, 530, 540, 550 and/or 560. Although illustrated as discrete blocks, various blocks may be divided into additional blocks, combined into fewer blocks, or eliminated, depending on the desired implementation. Processing may begin at block 510.

At block 510 (Connect to a Server), client device 120, via data synchronization manager 310, may connect to server 110 based at least in part on user account login information. Processing may continue from block 510 to block 520.

At block 520 (Receive a Data File from the Server), client device 120, via synchronization manager 310, may receive, from server 110, a data file stored in connection with the user account. In some embodiments, server 110 may provide a corresponding storage area in connection with the user account, and the data file may be stored on the storage area. Client device 120 may send, to server 110, a request to transmit the data file; and, in response to the request, receive the data file transmitted from server 110. Processing may continue from block 520 to block 530.

At block 530 (Store the Data File in a Local Data Storage), client device 120, via data synchronization manager 310, may store the received data file on a local data storage (for example, storage 260 in FIG. 2). The stored data file may or may not be modified by client device 120 (for example, modification unit 250 in FIG. 2 or modification component 420 in FIG. 4) in accordance with a user input to client device 120. Processing may continue from block 530 to block 540.

At block 540 (Receive a Request to Logout the Client Device), client device 120 and/or data synchronization manager 310 may receive, from a user account corresponding to user 100, a request to logout client device 120. User 100 may input the request to client device 120 using any types of user interface devices which may be operatively and/or communicatively connected to client device 120. Processing may continue from block 540 to block 550.

At block 550 (Determine that the Client Device is Disconnected from the Server and/or that the Data File is Not Synchronized), client device 120, via data synchronization manager 310, may determine whether client device 120 is disconnected from server 110 and/or whether the data file stored on the local data storage has been synchronized with the data file stored in connection with the user account. When it has been determined that the client device 120 is disconnected from server 110 and/or that the data file stored on the local data storage has not been synchronized with the data file stored in connection with the user account, processing may continue from block 550 to block 560.

At block 560 (Encrypt the Data File), client device 120, via data synchronization manager 310, may encrypt the data file stored on the local data storage. In some embodiments, the encryption of the data file may be performed based on an encryption key, and the encryption key may be provided by server 110 or generated by client device 120. In both cases, client device 120, via data synchronization manager 310, may delete the encryption key after encrypting the data file stored on the local data storage, and server 110 may maintain in its storage the encryption key to decrypt the encrypted data file at a later time. In some embodiments, the encrypted data file may be transmitted to server 110 when client device 120 is reconnected to server 110 for synchronization with the data file stored in connection with the user account.

As such, even though client device 120 may be logged off or otherwise disconnected from server 110 without synchronizing the data file stored on the local data storage (which may or may not be modified in client device 120) with the data file stored in connection with the user account, the data file on client device 120 may be kept in secrecy by encryption.

Figure 6:
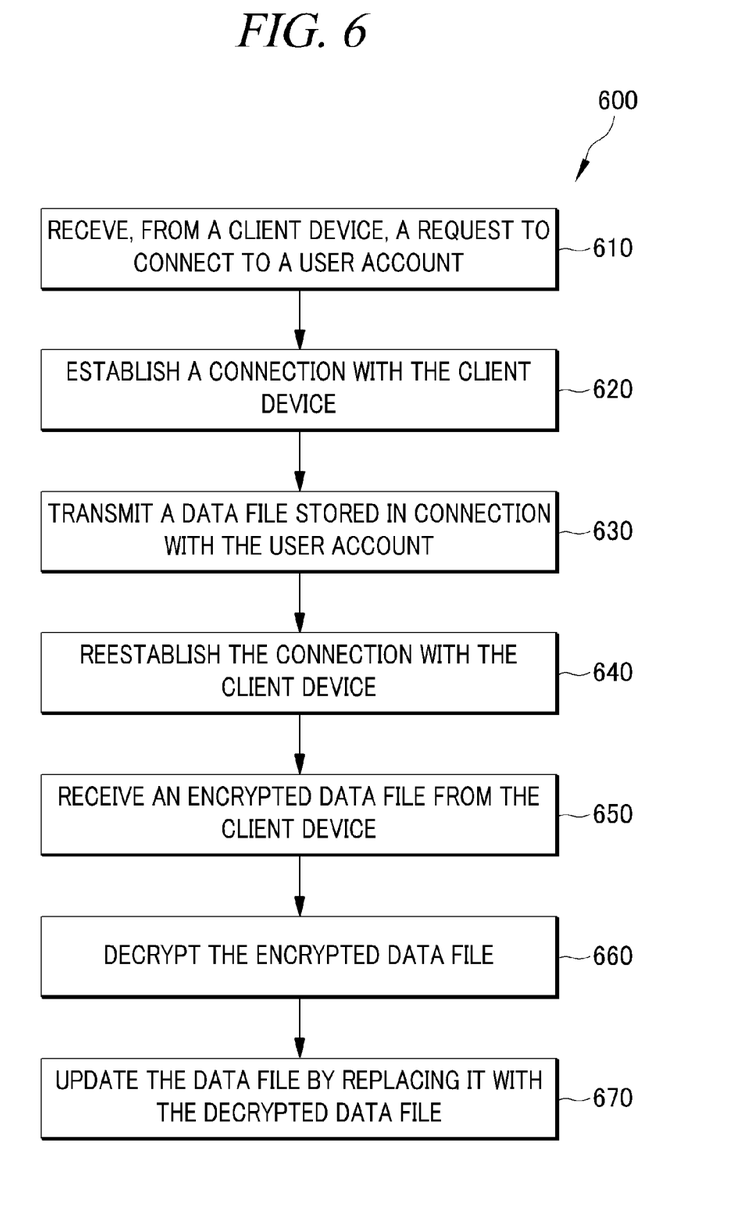
FIG. 6 shows another example processing flow for execution of at least portions of a data synchronization scheme, arranged in accordance with at least some embodiments described herein.

FIG. 6 shows another example processing flow 600 for execution of at least portions of a data synchronization scheme, arranged in accordance with at least some embodiments described herein.

Process 600 may be implemented in a remote storage server such as server 110 which provides a remote storage service to a client platform such as client device 120. Process 600 may also be implemented by computer programs or program modules that may be adapted to provide a data synchronization scheme and hosted by server 110. Thus, reference may be made to the embodiments depicted and described with reference to FIGS. 1-4. Process 600 may include one or more operations, actions, or functions as illustrated by one or more blocks 610, 620, 630, 640, 650, 660 and/or 670. Although illustrated as discrete blocks, various blocks may be divided into additional blocks, combined into fewer blocks, or eliminated, depending on the desired implementation. Processing may begin at block 610.

At block 610 (Receive, from a Client Device, a Request to Connect to a User Account), server 110 may receive, from client device 120, a request to logon a user account for user 100. The request may include user account login information (e.g., a user ID and a passcode). In some embodiments, server 110 may provide, in its storage, a storage area corresponding to the user account, on which a data file may be stored for user 100. Processing may continue from block 610 to block 620.

At block 620 (Establish a Connection with the Client Device), server 110 may establish a connection with client device 120 based on the request from the user account corresponding to user 100. By way of example, but not limitation, the connection may be a network connection over a network such as, for example, the Internet, a wireless network, a cellular network, a wide area network (WAN), a metropolitan area network (MAN), a local area network (LAN), a campus area network (CAN), a virtual private network (VPN), etc. Processing may continue from block 620 to block 630.

At block 630 (Transmit a Data File Stored in Connection with the User Account), server 110 may transmit, to client device 120, the data file stored in connection with the user account in response to a request from client device 120. Processing may continue from block 630 to block 640.

At block 640 (Reestablish the Connection with the Client Device), server 110 may reestablish the connection with client device 120, which had been disconnected. In some embodiments, after the connection with client device 120 has been disconnected, server 110 may receive, from client device 120, a request to connect to server 110 based on the user account login information. In response to the request, server 110 may reestablish the connection with client device 120. Processing may continue from block 640 to block 650.

At block 650 (Receive an Encrypted Data File from the Client Device), server 110 may receive, from client device 120, an encrypted data file and a request to update the data file stored in connection with the user account corresponding to user 100. In some embodiments, client device 120 may have generated the encrypted data file based on an encryption key, and server 110 may have generated the encryption key and provided it to client device 120 before and/or while transmitting the data file at block 630. In other embodiments, client device 120 may have generated the encryption key and provided it to server 110 before and/or while reestablishing the connection at block 640. In any case, server 110 may have received and/or stored the encryption key before proceeding to the operation of block 660. Processing may continue from block 650 to block 660.

At block 660 (Decrypt the Encrypted Data File), server 110 may decrypt the encrypted data file that was encrypted by client device 120 based on the encryption key. Server 110 may use the encryption key, which is maintained, for example, in a storage of server 110, for decrypting the encrypted data file. Processing may continue from block 660 to block 670.

At block 670 (Update the Data File by Replacing it with the Decrypted Data File), server 110 may update the data file stored in connection with the user account by replacing the data file stored in connection with the user account with the decrypted data file. As such, server 110 may be able to update the data file with one that may have been modified by client device 120.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
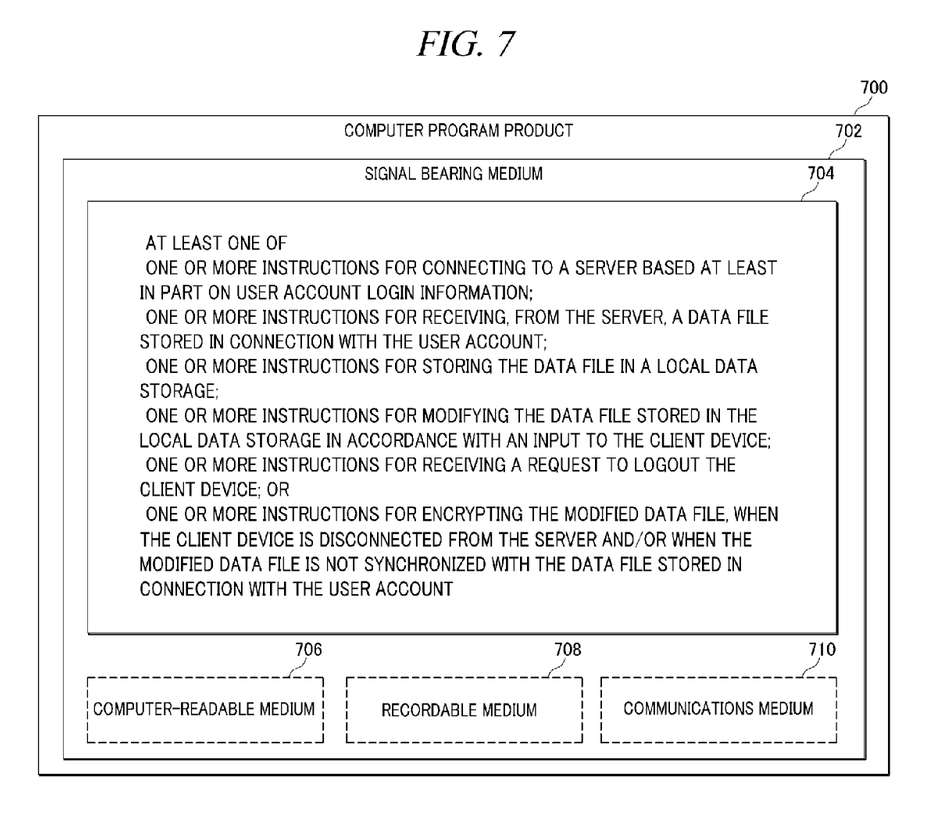
FIG. 7 illustrates an example computer program product that may be utilized to implement a data synchronization scheme, arranged in accordance with at least some embodiments described herein.

FIG. 7 illustrates an example computer program product that may be utilized to implement a data synchronization scheme, arranged in accordance with at least some embodiments described herein.

As depicted, program product 700 may include a signal bearing medium 702. Signal bearing medium 702 may include one or more instructions 704 that, when executed by, for example, a processor of client device 120 may provide the functionality described above with respect to FIGS. 1-6. By way of example, instructions 704 may include: one or more instructions for connecting to a server based at least in part on user account login information; one or more instructions for receiving, from the server, a data file stored in connection with the user account; one or more instructions for storing the received data file in a local data storage; one or more instructions for receiving a request to logout the client device; one or more instructions for determining that the client device is disconnected from the server and/or that the data file stored on the local data storage is not synchronized with the data file stored in connection with the user account; or one or more instructions for encrypting the data file stored on the local data storage.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of client device 120 by an RF signal bearing medium 702, where the signal bearing medium 702 is conveyed by a wireless communications medium 710 (e.g., a wireless communications medium conforming with the IEEE 802.11 standard).

Figure 8:
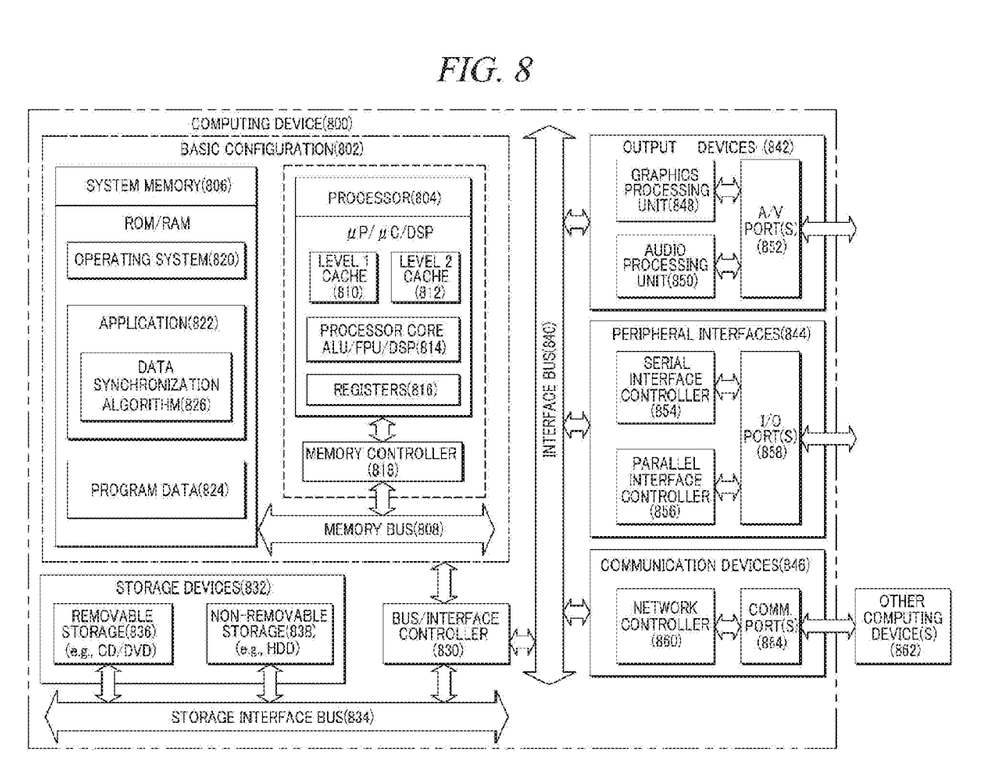
FIG. 8 is a block diagram illustrating an example computing device that may be utilized to implement a data synchronization scheme, arranged in accordance with at least some embodiments described herein.

FIG. 8 is a block diagram illustrating an example computing device that may be utilized to implement a data synchronization scheme, arranged in accordance with at least some embodiments described herein.

In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), nonvolatile memory (such as ROM, flash memory, etc.) or any combination thereof. System memory 806 may include an operating system 820, one or more applications 822, and program data 824.

Application 822 may include a data synchronization algorithm 826 that may be arranged to perform the functions as described herein including the actions described with respect to client device 120 architecture as shown in FIGS. 2-4 or including the actions described with respect to the flow chart shown in FIG. 5. Program data 824 may include any data that may be useful for providing the data synchronization scheme as is described herein. In some examples, application 822 may be arranged to operate with program data 824 on an operating system 820 such that the data synchronization scheme as described herein may be provided.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a client device, the method comprising:
   connecting to a server based at least, in part, on user account login information;
   receiving, from the server, a data file stored in connection with a user account;
   storing the received data file on a local data storage;
   receiving a request to logout the client device;
   responsive to a determination that either,
      the client device is disconnected from the server, or
      the data file stored on the local data storage has been modified after being stored and the modified data file is out-of-synchronization with the data file stored in connection with the user account,
      encrypting the data file stored on the local data storage;
   generating an encryption key based on at least one of the user account login information or device information of the client device;
   transmitting the encryption key to the server,
   wherein the encrypting the data file is based at least, in part, on the encryption key;
   deleting the encryption key after the encrypting the data file;
   reconnecting to the server based at least, in part, on the user account login information; and
   transmitting, to the server, the encrypted data file stored on the local data storage to update the data file stored in connection with the user account on the server after the client device reconnects to the server.

2. The method of claim 1, further comprising:
   modifying the data file stored on the local data storage in accordance with an input to the client device, prior to the receiving the request to logout the client device.

3. The method of claim 1, further comprising:
   deleting the encrypted data file stored on the local data storage.

4. A client device, comprising:
   a user interface configured to receive at least one of a request to connect to a server or a request to logout the client device;
   a communication interface configured to connect to the server based at least, in part, on user account login information and to receive, from the server, a data file stored in connection with a user account;
   a memory configured to store instructions; and
   a processor operatively coupled to the user interface, the communication interface, and the memory, wherein the processor is configured to execute the instructions stored in the memory to:

store the received data file on the memory; and based on a determination that either the user interface has received the request to logout the client device or that the client device is disconnected from the server, encrypt the data file stored on the memory, wherein the processor is further configured to execute the instructions stored in the memory to generate an encryption key based on at least one of the user account login information or device information of the client device, wherein the communication interface is further configured to transmit the encryption key to the server, wherein the processor is configured to execute the instructions stored in the memory to encrypt the data file stored on the memory based at least, in part, on the encryption key, wherein the processor is further configured to execute the instructions stored in the memory to delete the encryption key after the data file is encrypted, wherein the communication interface is further configured to transmit, to the server, the encrypted data file stored in the memory to update the data file stored in connection with the user account on the server, and wherein the transmission is performed after the client device is reconnected to the server based at least, in part, on the user account login information.

5. The client device of claim 4, wherein the processor is further configured to execute the instructions stored in the memory to:

modify the data file stored on the memory in accordance with an input to the client device.

6. The client device of claim 5, wherein the processor is further configured to execute the instructions stored in the memory to encrypt the modified data file based on the modified data file being out-of-synchronization with the data file stored in connection with the user account on the server.

7. The client device of claim 4, wherein the processor is further configured to execute the instructions stored in the memory to delete the encrypted data file stored in the memory, after the encrypted data file is transmitted to the server.

8. A non-transitory computer-readable storage medium having stored executable instructions that, in response to execution, cause a client device to perform or control performance of operations, comprising:

connect to a server based at least, in part, on user account login information;

identify a data file received from the server, wherein the data file was stored in connection with a user account;

store the data file on a local data storage;

modify the data file stored on the local data storage in accordance with an input to the client device;

detect a request to logout the client device;

encrypt the modified data file, based on a determination that either the client device is disconnected from the server or that the modified data file is out-of-synchronization with the data file stored in connection with the user account;

generate an encryption key based on at least one of the user account login information or device information of the client device;

transmit the encryption key to the server, wherein the encryption of the data file is based at least, in part, on the encryption key;

delete the encryption key after the encryption of the data file;

reconnect to the server based at least, in part, on the user account login information; and transmit, to the server, the encrypted data file stored on the local data storage.

9. The computer-readable storage medium of claim 8, wherein the operations further comprise:

delete the encrypted data file stored on the local data storage.

\* \* \* \* \*